Jan. 7, 1941.  O. LUTHERER ET AL  2,228,171
GAS AND AIR MIXER FOR BURNERS
Filed March 27, 1939

INVENTOR
OTTO LUTHERER
CHARLES E. SLADKY
BY
Hyde, Higley & Meyer
ATTORNEYS

UNITED STATES PATENT OFFICE 2,228,171

GAS AND AIR MIXER FOR BURNERS

Otto Lutherer, Solon, and Charles E. Sladky, Cleveland, Ohio, assignors to The North American Manufacturing Co., Cleveland, Ohio, a corporation of Ohio Application March 27, 1939, Serial No. 264,410

3 Claims. (Cl. 48—180)

This invention relates to gas and air mixers for fuel burners, and more particularly to such mixers of the Venturi type.

One object of the invention is to provide an improved gas and air mixer of the character described, in which the orifice and throat are in different parts of the mixer body, so that by carrying in stock the two body parts with their respective openings of various sizes a mixer may be readily assembled with any desired relation between orifice and throat areas, as opposed to the relatively large number of body styles or sizes required to be carried in stock when both the orifice and throat are in the same part, and in which the ratio of orifice or throat area to burner port area may be readily varied without dismantling the mixer.

A further object of the invention is to enable the sizes of the orifice and throat, or either thereof, to be readily varied, enabling the mixer, even after installation in a line or system, to be readily adjusted or accommodated to any given burner conditions, such as the burner port area, or friction losses between the mixer and burner or the like, for the purpose of securing the most efficient burner operation.

Further objects of the invention are in part obvious and in part will appear more in detail hereinafter.

Figure 1:
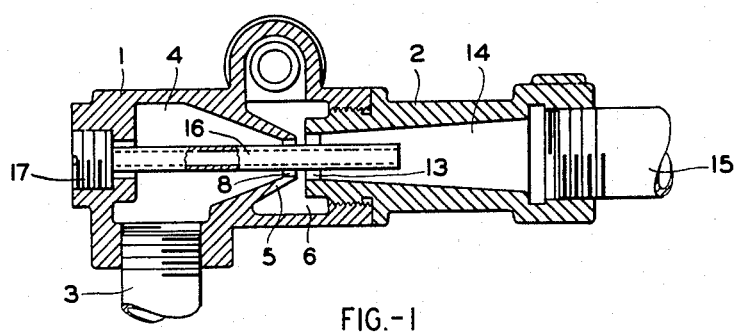
Figure 2:
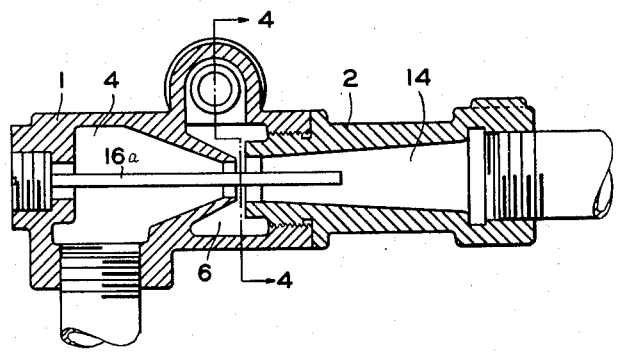
Figure 3:
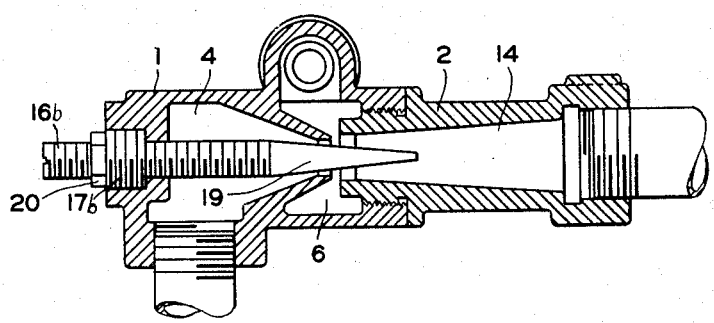
Figure 4:
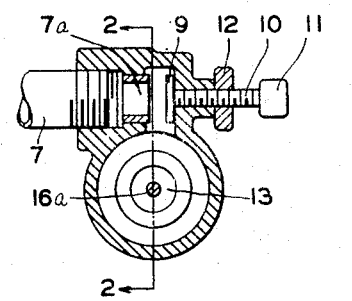

In the drawing, Fig. 1 represents a central longitudinal section through a mixer embodying the invention; Fig. 2 is a similar view on the line 2—2, Fig. 4, showing a modification; Fig. 3 is a similar view, showing still another form, including an adjusting device for the orifice and throat areas; and Fig. 4 is a sectional elevation on the line 4—4, Fig. 2.

The ultimate purpose of the gas and air mixer forming the present invention is to inspirate gas in direct proportion to the air passing through the orifice, to deliver the mixture to either one or a plurality of burners, and to secure the best operating conditions for the burner. In devices of this kind, the total quantity of gas that may be inspirated or drawn into and passed through the mixer and burner, and the maximum mixture pressure available or produced at the burner port, are dependent upon the available air pressure and the general design and proportions of the mixer and burner, and especially the relationship between the respective areas at the orifice, the throat, and the burner port.

Experience in the operation of Venturi type mixers shows that for any given area of burner port (including the area of all ports when several burners are supplied by the same mixer) only one area of orifice and one area of throat will produce (a) The highest mixture pressure at the burner port for the given air pressure, and (b) The highest vacuum or suction at the point of inspiration.

If the ratio of the several areas is incorrect, e. g., if the areas of orifice and throat are too greatly increased or become equal to or approach too closely the effective port area, the degree of inspiration or vacuum may be insufficient to inspirate and pass into the mixer enough gas in proportion to the air supply, or the degree of gas inspiration may even become zero. Proper operation of burner equipment utilizing Venturi mixers therefore is more or less dependent upon the maintenance of correct relations between the several areas, which ordinarily requires manufacturers of gas and air mixers to carry in stock almost an infinite number of mixer bodies with orifices and throat areas of various sizes to meet a wide variety of burner port areas.

Again, while the absolute area of the burner port may be known, its effective area is unknown and frequently is difficult of ascertainment, because it is influenced by friction losses due to the amount or arrangement of piping between the mixer and burner port. As the result, in practice, it therefore frequently is necessary, after installation of a mixer in a line or system, to remove and replace it with other parts having orifice or throat areas of a different size.

The objections to prior mixers are avoided by the present construction, where the orifice and throat are in different parts of the mixer and means is provided whereby their absolute and effective areas conveniently may be varied, for the purpose of varying the ratio of their areas to burner port area or piping conditions, as will appear.

Referring to Fig. 1 of the drawing, the mixer comprises a hollow casing or body having a base 1 to which is threaded a head 2. The base 1 communicates with an air supply pipe 3 coming from a suitable source of air pressure (not shown), the air being supplied to a chamber 4 separated by a wall 5 from a gas supply chamber 6 communicating with the gas supply pipe 7 (Fig. 4). In the wall 5 is located the orifice 8, the effective area of which controls the volume and rate of flow of the air under given air pressure conditions. The gas supply may be regulated by a suitable valve, such as the disc 9 attached to a threaded stem 10 capable of adjustment by rotation of the knob 11, into being fixed in any adjusted position with relation to the supply port 7a, by a lock nut 12.

Beyond the gas supply chamber 6 is the throat 13, formed as an opening in the inner end of the head 2, which in effect becomes a cross wall of the casing or body, separating the gas supply chamber from a mixing chamber 14 which, at the far end of the head, communicates with a burner pipe 15 leading to or forming part of one or more burners (not shown) of any suitable form or design and provided with ports through which the mixture is delivered to the combustion space, all as usual.

It will be observed that the orifice and throat 13 are in separate parts of the body, to-wit, the base 1 and head 2 thereof. Consequently, by carrying in stock a series of bases 1 with orifices of different sizes, and a series of heads 2 with throats of different sizes, any head may be attached to any base to produce any desired relation between orifice and throat areas, very greatly reducing the total number of parts required to be carried in stock and enabling a mixer to be conveniently assembled with orifice and throat areas which together may be readily adapted or accommodated to existing burner conditions, such as the port areas thereof in the manner which will now appear.

Having assembled a mixer with orifice and throat areas properly related to each other and reasonably close to the proper area with relation to burner port area it is now possible to secure more exact proportioning of the respective areas, because means is provided by which the effective area of either or both of the orifice and throat may be varied after the mixer is installed in the line, and without removing it therefrom. In the arrangement shown in Fig. 1 this means comprises a plug or filler member including a stem or shaft 16 attached to a solid or imperforate head 17 threaded into the outer wall of the body 1. The stem or plug 16 may be of tubular form, as shown in Fig. 1, its outer end, where it is attached to the head 17, being closed, or it may be a solid metal member as shown at 16a, Fig. 2. In either case its purpose is to blank out a portion of the absolute area of the orifice and throat, for which purpose it extends through and beyond both thereof. By carrying in stock a number of plug inserts, each including a head 17 and a stem or shank 16 or 16a, the stems or shanks being of varying diameter, it is possible, when upon installation it is found that the orifice and throat areas of a given mixer are not properly proportioned to the burner port area or to the friction loss through the piping, to remove the plug insert and replace it with one having a larger or smaller diameter stem or shank, to thereby secure the proper ratio of orifice and throat to burner port area and the most efficient operating conditions, including the maximum mixture pressure and inspiration of the proper quantity of gas in proportion to air, as before described.

In some cases it may be desirable to use an adjustable plug member, such as illustrated in Fig. 3, where the plug insert consists of a head 17b having threaded thereinto the stem or shank 16b having its forward end tapered, as shown at 19. By backing off the lock nut 20 the stem 16b may be adjusted lengthwise in the head 17b to more or less increase or diminish the effective orifice and throat areas and accommodate the mixer to the burner port area or to special piping conditions, as before described.

The cylindrical stems 16, 16a of Figs. 1 and 2, uniform in diameter from end to end, may be threaded or otherwise made longitudinally adjustable in their heads 17 in the same manner as the stem 16b is adjustable in the head 17b in Fig. 3, or, in other words, the stem 16b may be of uniform diameter from end to end with no tapered portion. With such an arrangement, as the stem is backed off or adjusted to the left in the views in the drawing, as the right-hand end approaches the throat opening, the effective area of said opening is increased, but without material increase in the effective area of the orifice, which modifies the suction produced and therefore modifies the gas and air ratio, but without variation in the total capacity of the mixer, particularly of the air supply.

Of course, if either of the rods 16, 16a or 16b is adjusted so far to the left in the drawing that its extreme right hand end passes beyond either or both of the throat and orifice the actual, as well as the effective area, of the throat or orifice or both, is increased, with consequent modification in the suction or inspirating effect. But it should be understood that the suction or inspirating effect may actually be modified without entirely withdrawing the end of the rod through either or both of the throat and orifice. As the end of the rod approaches the throat and orifice the balance of pressure is so delicate that a small endwise adjustment of the rod to merely vary the position of its end with reference to the throat and orifice will modify the suction or inspirating effect. In actual operation the rod is adjusted to that position which gives the most efficient operation, and in that sense the rod is adjustable to vary the effective size of the throat and orifice even if its end does not actually pass beyond them.

With all arrangements the mixer may be originally assembled with any desired relation between orifice and throat areas, and when assembled in the piping may have its orifice and throat areas adjusted to proper relation with the burner port area, or with friction loss or other special piping conditions, so as to always secure proper and most efficient operation.

What we claim is:

1. A gas and air mixer of the character described, comprising a hollow casing including base and head members secured to each other, said base member having an air supply chamber adapted for connection to a source of air pressure and a gas supply chamber adapted for connection to a source of gaseous fuel and being provided between said chambers with a circular opening forming an orifice, the head member being provided with a circular opening forming a throat providing communication from said gas supply chamber to a mixing chamber in said head member adapted for connection to a burner, said two openings being in alinement, whereby connection to each other of a base having a selected orifice area and a head having a selected throat area provides a mixer having any desired ratio of orifice and throat areas, and a rod-like plug member secured in said base member with its axis alined with the said alined openings, said plug member extending through said air chamber and through both of said openings to reduce the effective areas thereof.

2. A gas and air mixer, comprising a hollow casing provided with a supply chamber for air under pressure, a gas supply chamber and a mixing chamber, a cross wall provided with an opening forming an orifice between said gas and air supply chambers, a second cross wall provided with an opening forming a throat between said gas supply and mixing chambers, and a removable plug mounted in said casing and extending through the air supply chamber and axially into both of said openings for reducing the effective area thereof.

3. A gas and air mixer, comprising a hollow casing provided with a supply chamber for air under pressure, a gas supply chamber and a mixing chamber, a cross wall provided with an opening forming an orifice between said gas and air supply chambers, a second cross wall provided with an opening forming a throat between said gas supply and mixing chambers, and a removable plug mounted in said casing and extending through the air supply chamber and axially through both of said openings into said mixing chamber for reducing the effective area of both the openings and the mixing chamber.

OTTO LUTHERER.
CHARLES E. SLADKY.